United States Patent [19]

Kelley

[11] Patent Number: 5,933,072

[45] Date of Patent: Aug. 3, 1999

[54] CURRENT LEVEL CONTROL FOR TWACS INBOUND COMMUNICATIONS

[75] Inventor: Dennis L. Kelley, O'Fallon, Mo.

[73] Assignee: Distribution Control Systems, Inc., Hazelwood, Mo.

[21] Appl. No.: 08/966,447

[22] Filed: Nov. 7, 1997

[51] Int. Cl.⁶ .................................................. H04M 11/04
[52] U.S. Cl. .............................. 340/310.01; 340/310.02; 340/310.04; 340/310.07
[58] Field of Search .................... 340/310.01, 310.02, 340/310.03, 310.04, 310.05, 310.06, 310.07; 375/257, 259

[56] References Cited

U.S. PATENT DOCUMENTS

| | | | |
|---|---|---|---|
| 3,938,129 | 2/1976 | Smither | 340/310.04 |
| 4,021,797 | 5/1977 | Hofmeister | 340/310.07 |
| 4,914,418 | 4/1990 | Mak et al. | 340/310.04 |
| 4,996,513 | 2/1991 | Mak et al. | 340/310.04 |
| 5,262,755 | 11/1993 | Mak et al. | 340/310.02 |

*Primary Examiner*—Jeffery A. Hofsass
*Assistant Examiner*—John Tweel, Jr.
*Attorney, Agent, or Firm*—Polster, Lieder, Woodruff & Lucchesi

[57] ABSTRACT

A method of controlling the current level of an inbound signal (Si) used in a TWACS (two-way communication system) for an electrical distribution system. The inbound signal conveys operational information and data on the performance of the system. The method includes first measuring the current (I) of the inbound signal. This current measurement is performed for each of a predetermined number of successive inbound signals. The root mean square (RMS) value of the measured currents is then determined. Operation of a solid state device (SCR) used to generate the inbound signal is now controlled as a function of the root mean square value. A line current propagating through the electrical distribution system is now modulated with the inbound signal. The inbound signal occurs at a predetermined range of angles (X) within a line voltage cycle regardless of variations in the line voltage characteristics. This enables the inbound signal to be readily detected.

11 Claims, 3 Drawing Sheets

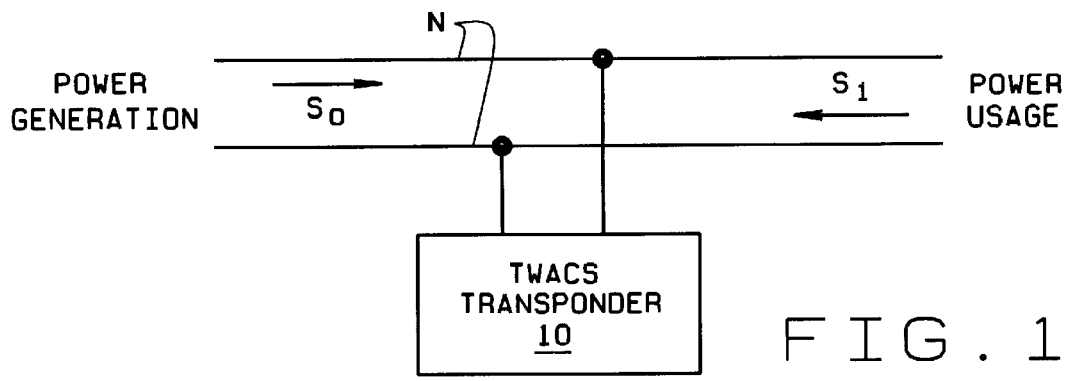
FIG. 1
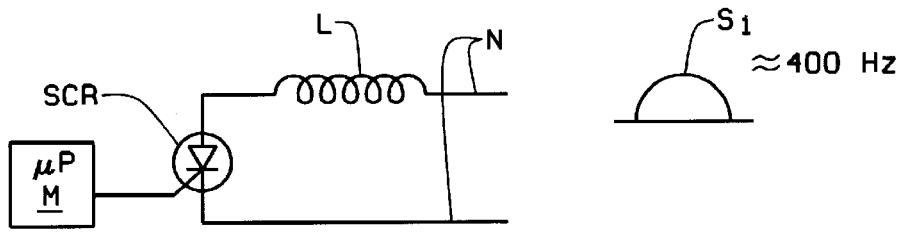
FIG. 2
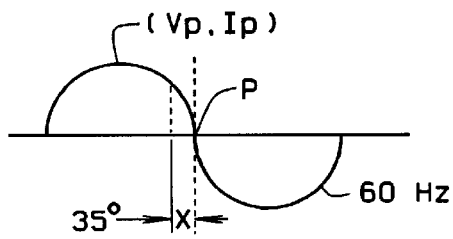
FIG. 3
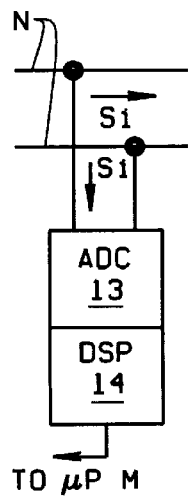
FIG. 4
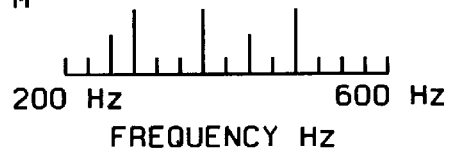

CURRENT LEVEL CONTROL FOR TWACS INBOUND COMMUNICATIONS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

This invention relates to data communications over electrical distribution systems, and more particularly, to a method for maintaining a constant root mean square (rms) current level on a communications channel by controlling the firing of a power control electronic component.

Data communications over an electrical distribution system to ascertain performance at various locations throughout the system are well-known in the art. Communications can be in either an outbound direction; i.e., from a central location to outlying locations, or inbound; i.e., information transmitted from the outlying locations back to the central location. Various features and requirements of such a system are disclosed and described in U.S. Pat. Nos. 5,486,805; 5,198,796; 5,262,755; 4,996,513; 4,963,853, 4,918,422; 4,914,418; and 4,658,238. All of these patents are assigned to the same assignee as the current application.

For inbound communications from a remote to a central site, a minimum current level (peak or rms) must be available at the input to a transponder in order for the incoming data to be properly received and processed. Because the carrier wave has a generally sinusoidal waveform, it is the common practice to sense a data signal riding on the carrier at a point approximately 30° before zero crossing of the waveform. In designing the transponder, the components employed must be capable of tolerating the current levels associated with the signal.

There are several problems with the present inbound signaling technology, the biggest of which is cost. Present inbound components cost more than a quarter of the total cost of a product such as a SMT (surface mounted transformer) or an IMT (impedance matching transformer). One reason for this high cost is the inductor used in the unit must be capable of dissipating very high power levels; e.g., up to 500 watts. The inductor must also operate over a very wide range of voltages and over a wide range of power ratings for the power transformer into which the signal is directed. The transformer range is from 15 KVA, up to 500 KVA. Accordingly, the inductor must be designed so a sufficient TWACS inbound signal is generated when a 15 KVA transformer is used; and, the inductor must not overheat if a 500 KVA transformer is the signal source. If means were available by which the strength of the inbound current pulse could be measured, so adjustments could then be made to maintain a fixed current level, then an inductor not requiring a lot of excess capacity could be used. This would mean a lower cost component, and more capacity in a firing circuit if the present element is used.

In designing new products, the ability to operate at several different voltages would also be highly desirable. Operating voltages include, for example, 120v, 208v, 240v, 277v, 480v, and 600v. An inbound circuit operating over part or all of this range of voltages further reduces costs because the higher volume of use would decrease per unit cost. Further, there are meters currently available which are capable of multi-voltage operation and so could be used for part, or all, of the operating voltages. By providing the capability to adjust the firing angle at which the inbound signal is triggered, a point can be selected at which the maximum RMS current is substantially lower than has been heretofore possible. A current having a 10–15 amp value, for example, is reasonable to expect, whereas before a 30 or 40 amp value would be needed. As noted, providing such a capability would result in more flexible operation and create substantial cost savings.

BRIEF SUMMARY OF THE INVENTION

Among the several objects of the present invention may be noted the provision of apparatus and a method for measuring the signal strength of an inbound current pulse in a TWACS and for adjusting the firing angle of a solid state device in response to the measured strength, so to maintain a substantially fixed current level regardless of variations in the electrical system with which the TWACS is used (for example, excursions in line voltage);

the provision of such a method by which the maximum RMS value of the inbound current can be held at a level substantially lower than is achievable with existing technology;

the provision of such a method which facilitates the use of system components such as capacitors, inductors, and transformers which are smaller capacity components than previously required thereby effecting a substantial cost savings;

the provision of such a method for measuring the current of an inbound signal by directing the current through a known resistance value in a transponder and measuring the voltage drop across the resistance;

the provision of such a method for using the measured current values to compute an $i^2t$ value for an inbound pulse, for performing this measurement and calculation for a predetermined number of successive inbound pulses, and using the result of the combined measurements to determine if a firing angle adjustment should be made and the amount of such adjustment;

the provision of such a method to be non-responsive to noise transients or the like which appear so as to provide a high degree of stability;

the provision of such a method by which a transponder can be initially calibrated to have a preset firing angle; and, the provision of such a method and apparatus which can be retrofitted into existing TWACS installations to provide a more efficient transfer of inbound signals in these installations.

In accordance with the invention, generally stated, a method is described of controlling the current level of an inbound signal used in a TWACS for an electrical distribution system. The inbound signal conveys operational information and data on the performance of the system. The method includes first measuring the current of the inbound signal. This current measurement is performed for each of a predetermined number of successive inbound signals. The root mean square value of the measured currents is then determined. Operation of a solid state device used to generate the inbound signal is now controlled as a function of the root mean square value. A line current propagating through the electrical distribution system is now modulated with the inbound signal. The inbound signal will occur within a limited range of phase angle, regardless of variations in the line characteristics. This enables the inbound signal to be readily detected. Other objects and features will be in part apparent and in part pointed out hereinafter.

BRIEF DESCRIPTION OF THE SEVERAL VIEWS OF THE DRAWINGS

In the drawings, FIG. 1 is a simplified representation of a power transmission line across which a transponder for a TWACS is connected;

FIG. 2 is a simplified schematic of circuitry for generating a TWACS inbound signal;

FIG. 3 illustrates a sinusoidal line voltage and indicates a nominal firing point at which a silicon controlled rectifier of the inbound signal generating circuit is fired;

FIG. 4 is a block diagram of a TWACS inbound signal detector;

Corresponding reference characters indicate corresponding parts throughout the drawings.

DETAILED DESCRIPTION OF THE INVENTION

Figure 5A:
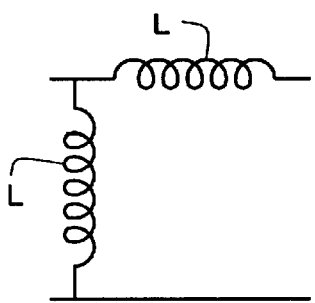
FIGS. 5A–5C represent various serial-parallel combinations of inductors for use in controlling the firing angle of a solid state device for TWACS inbound signaling.

Currently, a TWACS inbound signal Si is generated by firing a silicon controlled rectifier (SCR) in series with a 450 µH, 0.55Ω inductor L across power lines N (see FIG. 2). This produces a generally sinusoidal current pulse for one half cycle at a frequency of approximately 400 Hz. The SCR fires approximately 35° before the zero crossing point P on a 60 Hz waveform (see FIG. 3). The SCR then self commutates slightly past the 0° crossing where current drops to 0 amps. The point at which the SCR is triggered is determined by the voltage waveform present on the AC line, and the particular firing point is determined using the TWACS outbound signal $S_O$ detection circuitry incorporated in a transponder 10 (see FIG. 1) in which a voltage reference used is based upon the average AC voltage amplitude. The firing angle x (see FIG. 3) remains near to 35° before zero crossing, regardless of the actual AC voltage, and as a result, the inbound signal Si current varies with line voltage variations. This creates a problem because transponder 10 must be capable of communicating even at low line voltages, yet the inbound firing point must be selected so as to provide sufficient current at these low voltage levels. When the AC line voltage is at a high voltage (vp) condition, the current level of the inbound signal increases as well. It has been found that, as a result of these line excursions, the inbound current can vary by as much as +/−20% from a nominal value. But, if inbound current were controllable to the low line voltage current level, a 40% reduction in the power level of the inbound inductor could be realized.

A TWACS inbound signal detector 12 (see FIG. 4) at a substation uses an analog-to-digital converter (ADC) 13 and a digital signal processor COSP 4 and digital signal processing techniques to detect an inbound signal. The detector looks for spectral content in the 200–600 Hz range for an indication an inbound signal Si pulse is present. The inbound signal firing point is controlled by a microprocessor M (see FIG. 2) which operates to maintain the inbound signal within a predetermined frequency range. If the frequency content exceeds this range, a substantial portion of the inbound signal is attenuated by the power system. Another problem is caused by the noise level present in an inbound signal since the actual level of inbound signal detection depends on the amount of noise which must be subtracted from the signal. And, there is, at this time, no determinative information as to what signal-to-noise ratio must be maintained to insure inbound signal detection.

There are a variety of ways by which an inbound circuit can be controlled to provide the capability of adjusting the inbound signal Si of a transponder. In accordance with the invention, the firing point is now selected so it occurs where the maximum current Ip is substantially lower than where it has previously been possible to select. By doing so, the maximum current now realizable is reduced to a range of 10–15 amps. In making a determination to use firing angle adjustability as the desired approach, a number of alternatives were investigated. These include:

designing a new inductor, developing various serial-parallel combinations of current inductors, having a self adjusting firing angle, ringing inbound pulses, switching the inductor used for detecting inbound signals, and a hybrid approach of various of the above.

With respect to the design of a new inductor, it has been recognized that a problem with present inbound inductors is their non-suitability for use with transformers having a low KVA rating. This problem is exacerbated by the desire to develop a unit operable at several different voltage levels. Here, a solution is to provide several different inductors a particular one of which is provided with a transponder having a specific voltage and range of KVA ratings. Under this approach, as many as nine separate inductors might be employed.

Figure 5B:
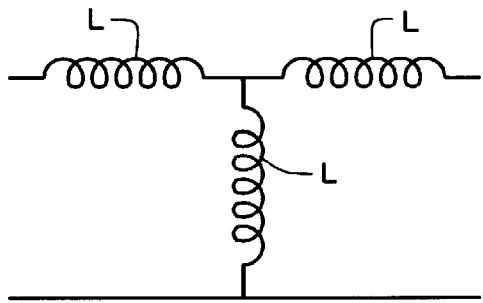
Figure 5C:
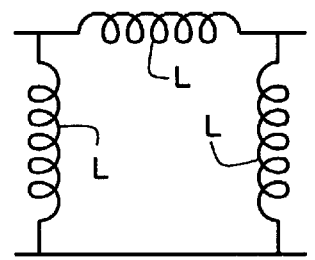

With respect to series-parallel combinations, various voltage and KVA ratings could be accommodated be designing various series and/or parallel combinations of inductors with the inductors each having specific values (see FIGS. 5A–5C). A particular problem with this approach is that it is unlikely that certain of the inductors that would be required would fit into any kind of reasonably sized electronic meter.

Concerning firing angle, one of the parameters capable of being controlled by a transponder is the firing point of a SCR. This provides control over an inbound waveform's amplitude at a given voltage and KVA rating, if there is the capability of sensing the amplitude of the inbound current pulse. If current level is sensed, then a transponder can react to changes in voltage for different KVA ratings. The transponder responds to these changes by increasing the firing angle in response to a decrease in current level, or decreasing the firing angle in response to a increase in current level. A problem with this approach is that changes in firing angle also effect the spectral content of an inbound signal Si waveform. However, this approach does have potential cost reductions since the overdesign of the inductive element can be eliminated, and a single inductor can be used for several voltages and different KVA ratings.

Figure 6:
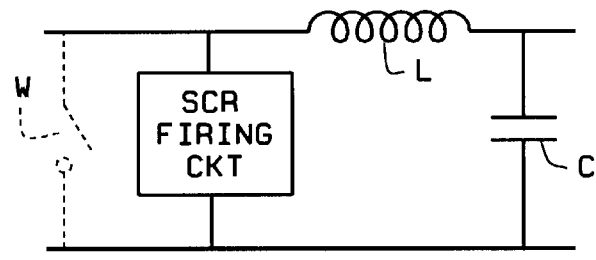
FIG. 6 is a simplified schematic for another approach to control the firing angle for an inbound signal.

A ringing inbound pulse approach (see FIG. 6) involves adding a series capacitor in the detection circuit with the inductor and SCR, the capacitor being connected across the line voltage. When the SCR fires, the inductor and capacitor generate a current pulse which is sinusoidal for one half cycle. When the current goes to zero, the SCR self commutates and the capacitor is left with roughly twice the applied voltage. The time duration (td) of the current pulse is:

$$t_d \approx \pi * \sqrt{L*C}$$

and the peak current (Ip) is given as:

$$I_p \approx V_s * \sqrt{\frac{C}{L}}$$

Where Vs is the applied voltage when the SCR is fired. It will be recognized from these formulas that the detection circuit has independent control of both frequency and amplitude. Once the frequency of the pulse is determined by the selection of the proper inductor L and capacitor C values, the amplitude of the pulse can be adjusted by changing the firing point of the SCR. A problem with this circuit is that the capacitor has a voltage of 2*Vs after the SCR turns off, and this voltage must be drained off prior to occurrence of the next pulse. However, this problem can be solved. One way, for example, is to reverse the polarity of the capacitor, and fire the circuit again. This action reverses the voltage on the capacitor and results in a larger current pulse than the initial pulse. That is because the net voltage across inductor L, at turn-on, is Vs plus Vc, where Vc is the voltage across the capacitor. Repeated firings can be done. A second way is to allow the ringing current waveform to go negative. If a switch W is in the circuit rather than an SCR, a damped oscillatory current waveform results. By allowing the waveform to ring for one negative current pulse of the same frequency as the positive pulse, at the end of that ring, the voltage on the capacitor is essentially 0v. What has been done is to produce one cycle of a sinusoidal current waveform with little or no energy having been gained or lost by the circuit since the positive current pulse drew energy from the power line and stored it in capacitor C, and the subsequent negative current pulse transferred the stored energy back into the power line. Because inductor L and capacitor C are not perfect components, there is some energy loss. But this has been found to be less than 10% of the actual signal level injected. As a result, instead of transponder T having to dissipate 500 w., it only has to dissipate 50 w. Further, it is possible that injecting a full cycle of current causes little of the energy to be lost as DC current. This is because while a half-cycle of AC current has a considerable amount of its energy represented as a DC component, a full-cycle has no DC component at all. A problem with this approach is that the desired frequency of operation is, for example, approximately 400 Hz. At this frequency, and assuming a 100 a., 400v. input, the inductor size would exceed 1000 µH, and the capacitor 100 µf. While elements of these sizes are feasible, they are also very expensive.

Regarding inbound switching, a major problem with existing designs is inductor L must absorb 500 w. for extended periods of time. Heretofore, this problem has been solved by adding thermal mass to the inductor. This allows a burst of power to be accommodated; however, a long cool down period is then required. If a transponder must continue to dissipate this much power, then no major cost savings or size or weight reductions are realized. But, if this power can be dissipated somewhere else, for example, the enclosure housing the transponder, then cost savings, size and weight reductions are possible. For example, if a distribution transformer DT, which has a rating of 5 KVA were used, an additional 500 w. would not be a problem.

Figure 7:
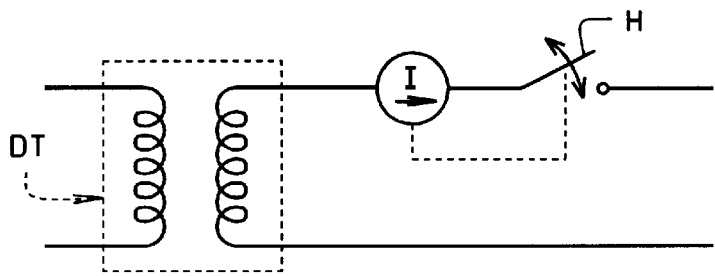
FIG. 7 is a simplified schematic of a switch used in conjunction with a distribution transformer, the switch being controlled by a current sensing device.

As shown in FIG. 7, one way of doing this is to employ a fast turn-on/turn-off switching element H which has a very low resistance or voltage drop. This would force current limiting to be done by transformer DT and the distribution wiring. The switch is operated by detecting the current level (as at A) and turning the switch off when the current rises above a predetermined level. The pulse, which is a short duration pulse, has a peak amplitude of approximately 200 a. After the current level falls back below this level, the switch is reactivated. The inbound pulse would now be extracted from the resulting "chopped" current waveform.

This technique could also be used to shape the current pulse, back at a substation, by using pulse position modulation techniques. Depending upon how it were done, the resulting waveform generated could have any shape and magnitude. It could also be combined with the previously described inbound ring pulse technique to generate a sinusoidal pulse of higher frequency than that possible using only that approach. The sinusoid would comprise modified high frequency pulses having a pulse shape with which the above-described technique can now be used. That would allow the inductor L and capacitor C shown in FIG. 6 to have a value which would be much more reasonable. Even so, cost is still a factor because high current, high speed, high voltage switches are costly. Further, additional study is required to obtain a better understanding of power system transfer functions in order to insure acceptable communications are possible.

The above technique where a circuit is used to fire a single half-cycle of current at high frequency is also useful as a communications technique in a local area network (LAN). If a single pole mounted transponder is used to monitor the current levels coming out of a distribution transformer DT, then a very low power, low current pulse could be usable to enable a transponder at a using site (house, office, etc.) to communicate with the pole mounted transponder. The current pulse could be inserted at any convenient point in the AC waveform, and would enable the transponder to accept an input from the site in real time. The pole mounted transponder circuitry would convert the current pulse into a pulse suitable for use as a TWACS inbound signal. Further, the transponder circuitry could use the techniques described above to achieve greater efficiency and provide larger networks to be accommodated without any loss of throughput.

Figure 8A:
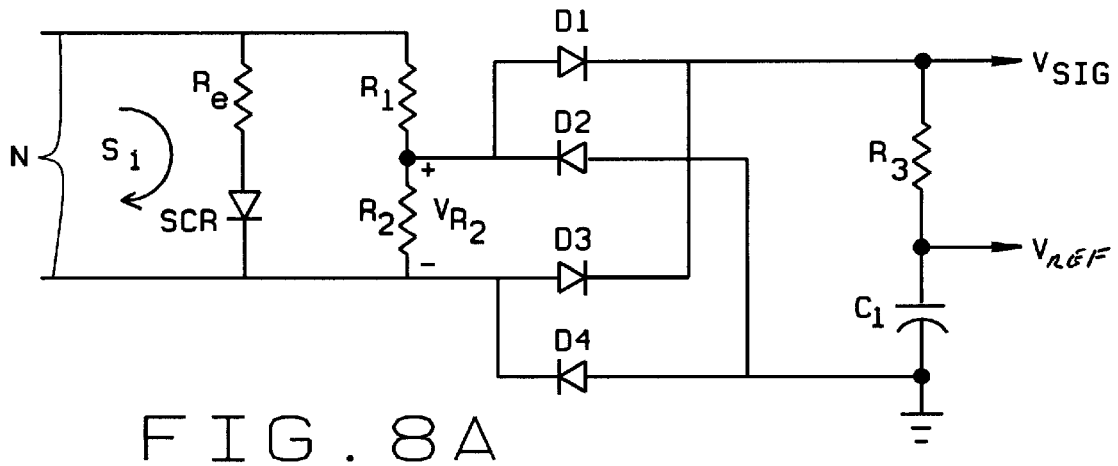
FIG. 8A is a simplified schematic illustrating circuitry of the present invention for controlling firing angle as a function of the RMS value of the current in an inbound signal.
Figure 8B:
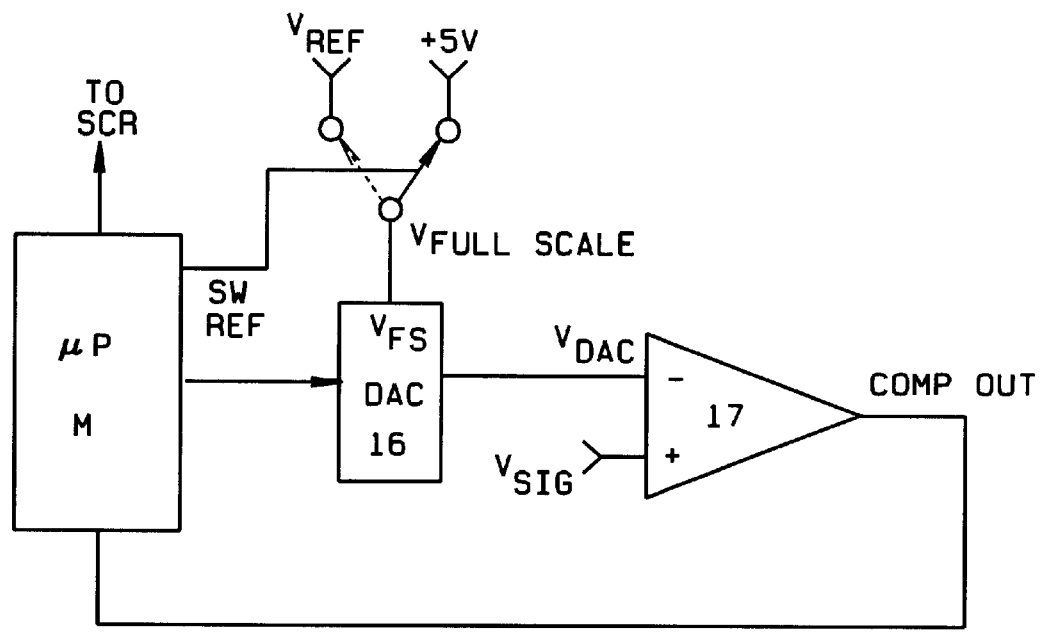
FIG. 8B is a simplified schematic further representing the circuitry of the present invention; and, FIGS. 9–12 are voltage waveforms occurring at different locations throughout the circuitry.
Figure 9:
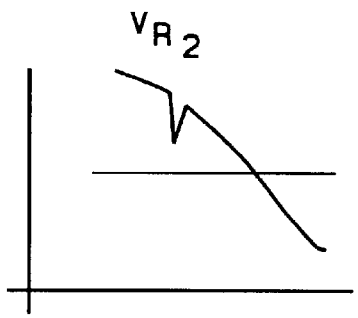
Figure 11:
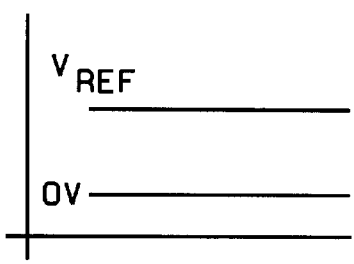

To implement an adjustable angle method of the present invention, the inbound current is first measured by directing the inbound signal Si through a known resistance Re (see FIG. 8A) in the transponder and measuring the voltage drop across this resistance. This resistance is, in fact, the signaling element which, in previous designs, is typically an inductor. The outbound detection circuit is now modified to take measurements on the voltage waveform across signaling element Re and the SCR. The modification comprises the addition of a switchable fixed voltage reference Vref (see FIG. 11) supplied to a digital-to-analog converter (DAC), as shown in FIG. 8B, as the full scale voltage V input. Resistance Re and the SCR are series connected, and are connected across resistors R1, R2. The voltage VR2 (see FIG. 9) is developed across resistor R2. A rectifier bridge comprising diodes D1–D4 connects across resistor R2 and a resistor R3 and a capacitor C1 are series connected across the output of the bridge. The voltage Vsig. is provided as one voltage output from this circuitry, and the voltage Vref is another of the outputs.

Figure 10:
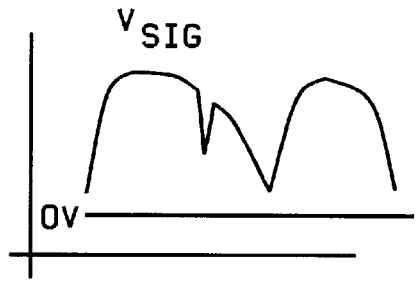
Figure 12:
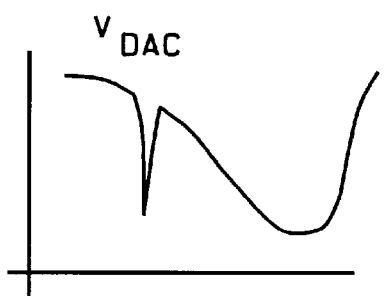

When doing outbound detection, the V full scale input to DAC is Vref, which allows the DAC to track AC line voltage. When measuring inbound current, a fixed reference is needed to obtain absolute, not relative, measurements of the inbound current. When inbound signaling is occurring, the voltage Vsig at one input to a comparator 17 represents the inbound current through resistance Re (see FIG. 10), since the voltage across the SCR is virtually zero. When not signaling the inbound current value, this voltage is simply the AC line voltage. The DAC is used to measure the exact time at which the Vsig voltage crosses the DAC output voltage, Vdac (see FIG. 12). This is used repeatedly to obtain a series of voltage and delta time values which represent the inbound current pulse.

Current measurement involves taking these amplitude and delta time samples and calculating the $i^2t$ value of the inbound pulse. What is really desired is to obtain the RMS value of the current, but this is difficult to obtain using a small microprocessor such as microprocessor M. The $i^2t$ value can be used directly to control the RMS current, since if one can maintain a constant $i^2t$, one can also maintain a constant RMS value. The $i^2t$ is calculated as:

$$i^2t = \sum_{n=1}^{N} V_{DAC}(n) \times \Delta t(n)$$

Which is related to the RMS value as:

$$\text{RMS} \cong \frac{1}{60}\sqrt{i^2t}$$

However, determining the $i^2t$ value of the current, rather than its RMS value, is an easier calculation.

Next, the angle x (see FIG. 3) with respect to the zero crossing point of the inbound signal waveform at which the SCR is triggered is adjusted. It will be understood that while it is undesirable to fire the SCR at an incorrect wrong angle, it is also undesirable to shift the angle at which the SCR is triggered back and forth in response to noise transients. Further, it is a constraint on the TWACS that the inbound current from four successive cycles of the waveform (which constitute a data bit) not significantly vary. Accordingly, the method of the invention includes measuring four successive interbit firings and averaging together the sampled inbound current values. This average is then used to calculate the deviation of the inbound current level from a predetermined value and the amount of adjustment from the previous firing angle setting. The new firing setting is used for the next bit. The amount of adjustment is proportional to the calculated error; however, the actual adjustment must be carefully selected. For example, if the firing angle is set too high, an overshoot, or oscillations, can result. It normally requires several adjustments before the correct angle is set.

Now, the transponder produces a firing angle setting which is more precise than that previously obtainable using digital-to-analog conversion (DAC) thresholding techniques. These techniques provide a firing angle adjustments of only about 1°. With the method of the invention, adjustments of substantially less than 1° are now possible. This is important in low firing angle situations because DAC techniques provide only about a 5% resolution in angle. Using the method of the present invention, much greater resolution is possible.

After the SCR firing angle is adjusted to the calculated angle, the firing angle for inbound current will be held close to this set point value. Subsequent inbound signals need not have much variation in their firing angle to maintain the set point value, unless waveform parameters change. The most likely change is the voltage level of the inbound signal. If the transponder is adjusted to a line voltage of 220 VAC during an inbound message, and the voltage changes to 260 VAC before the next inbound signal, this next inbound signal will be at a much higher value than the set point value. To minimize this effect, before the transponder fires the SCR, the AC line voltage is measured. If the line voltage has changed significantly, the firing point will be adjusted before the SCR is triggered in response to the inbound signal.

Because significant AC line voltage variations are both infrequent and transient, a preadjustment may not be necessary. When an adjustment is made, however, the degree of adjustment is a function of the previous firing point, the source impedances, the previous line voltage, and the present line voltage, among others. Regardless of whether this operation is performed, the method of the invention still effects a change in firing angle, although the processing of the necessary information and execution of the algorithm will be slightly longer if this feature is implemented. Again, because these variations are rare, they have minimal effect on the communications performance of the system.

It is important that when the method of the invention and the circuitry by which this is accomplished are first installed, either as a new installation or as a retrofit, that the firing angle for the SCR be such that the current level sufficient for an inbound signal Si response be detected. This could be accomplished several ways. One is to require that the unit be shipped with the firing point set to an angle near the highest needed setting. Thus, for example, the firing angle could be initially set for an inbound signal voltage on the order of 240 volts. A second approach is to program the transponder to set the firing angle for a preselected voltage level any time a power outage occurs. The transponder will be capable of adjusting the angle quickly so there is no damage done should the SCR be fired at too high an angle when first powered up.

To achieve the greatest degree of accuracy in setting the firing angle, the transponder is calibrated when a resistive element is installed. Such an element will have a resistance whose value only varies +/−5% of a nominal resistance value. Since the element is the shunt across which inbound signal current is measured, controlling the resistance value will limit any set point error. This potential error is also substantially eliminated as part of the calibration process.

The calibration process will be as follows. The transponder would be sent a TWACS command, and would be requested to send an inbound signal response. This command would be a special command telling the transponder not to adjust the angle at this time, but rather to measure the inbound current level. Simultaneously, the actual inbound current level would be measured using a device external to the transponder. The external device would read the transponder's current level measurement, compare it against that measured by the device, and calculate any calibration factor which must be applied to the transponder reading to bring the two readings into conformance. This calibration factor is then loaded into the transponder's memory.

After calibration and installation into a TWACS, the transponder will adjust the firing angle as follows:

First, any adjustment which is made will be proportional to any measured error.

Second, an adjustment will be made only after every 4th firing. This is because the current level of an inbound signal cannot be changed during occurrence of a bit.

Third, the firing angle will be initially set for a moderately high level. If this is a problem, it is so only with very low KVA transformers. Alternately, a maximum firing angle value for the SCR can be set for the first few firings with this angle maintained until there is a drop in current level.

Fourth, the response time of the transponder can be set to filter out transient noise which would otherwise cause too frequent an adjustment of firing angle.

Fifth, voltage measurements are made between firings of the SCR with any adjustment in firing angle made on the basis of the current voltage level and the level when the last inbound signal Si was received.

Sixth, the firing point is based upon a fixed voltage. Because of this, current will go up if the line voltage increases, and current will go down if the line voltage decreases.

What has been described is apparatus and a method for measuring the signal strength of an inbound current pulse in a TWACS and adjusting the firing angle of a solid state device in response to the measured strength. This permits a substantially fixed current level to be maintained regardless of variations in the electrical system with which the TWACS is used. Further, the TWACS can use components such as resistors, capacitors, inductors, and transformers which are smaller capacity components than previously usable which can effect significant cost savings. In operation, the method enables the inbound current to be fixed and held at the predetermined value regardless of the actual AC voltage, this being done by first directing an inbound signal across a known resistance so the voltage drop across the resistance can be measured and the signal current determined. This is done for at least four successive signals with an $i^2t$ value being computed for each inbound pulse. The results of the combined measurements are now used to determine if the firing angle adjustment should be adjusted and, if so, by how much. The system is not responsive to noise transients so there is no constant adjustment of the firing angle. This lends stability to the TWACS. A transponder incorporating the features of the invention can be used as a new or retrofit unit and each transponder is calibrated prior to its installation.

In view of the foregoing, it will be seen that the several objects of the invention are achieved and other advantageous results are obtained.

As various changes could be made in the above constructions without departing from the scope of the invention, it is intended that all matter contained in the above description or shown in the accompanying drawings shall be interpreted as illustrative and not in a limiting sense.

I claim:

1. A method of controlling the current level of an inbound signal used in a TWACS for an electrical distribution system, the inbound signal conveying operational information and data on the performance of the system to the TWACS comprising:

measuring the current of the inbound signal;

performing the current measurement for each of a predetermined number of successive inbound signals;

determining the root mean square (RMS) value of the measured current values;

controlling the operation of a solid state device used to generate the inbound signal as a function of the root mean square value; and modulating a line current propagating through the electrical distribution system with the inbound signal occurring at a predetermined range of angles within a line voltage cycle regardless of variations in the line voltage characteristics for said inbound signal to be readily detected.

2. The method of claim 1 wherein each inbound signal includes a portion of a bit of information being communicated over an electrical distribution system with which the TWACS is used, the number of successive inbound signals for which a current measurement is corresponding to the number of inbound signals comprising a bit.

3. The method of claim 2 wherein the number of successive inbound signals for which a current measurement is made is four.

4. The method of claim 1 wherein determining the root means square value of the measured currents of the successive inbound signals includes measuring the current, and calculating the $i^2t$ value for the inbound signal, where i is the measured current and t is the pulse width of the inbound signal.

5. The method of claim 4 further including summing the $i^2t$ values for the successive inbound signals, taking the square root of the resulting sum, and approximating the result as the root means square value used to control when an inbound signal is generated for the inbound signal to occur at the predetermined angle.

6. The method of claim 5 wherein said solid state device is a silicon controlled rectifier and controlling operation of said solid state device includes gating said silicon controlled rectifier into conduction.

7. In a TWACS used with an energy distribution system, system information data being conveyed using an inbound signal imposed upon a current waveform propagating through the distribution system, apparatus for controlling generation of the inbound signal for the inbound signal to occur at a predetermined point within the voltage waveform, comprising:

means measuring the current for each of a predetermined number of successive inbound signals;

means determining a root mean square (RMS) value for the measured currents; and, means controlling operation of a solid state device used to generate inbound signals as a function of the root mean square value thereby to control the generation of said inbound signals so said signals occur at a predetermined angle within a line voltage cycle regardless of variations in the line voltage characteristics whereby said inbound signals are readily detected.

8. The apparatus of claim 7 further including a transponder installed in the electrical distribution network and through which inbound signals are routed, said means measuring current including a resistance located in said transponder.

9. The apparatus of claim 8 wherein current measurements are made for four successive inbound signals and said digital signal processor processes each of said converted current measurements, calculates an $i^2t$ value for each successive inbound signal where $i^2t$ is calculated from a summation of voltage and delta time measurements, $$i^2t = \sum_{n=1}^{N} V_{DAC}(n) * V_{DAC}(n) * \Delta t(n).$$

10. The apparatus of claim 9 wherein said solid state device is a silicon controlled rectifier.

11. The apparatus of claim 10 further including a reference voltage source for producing a reference voltage applied to said Digital to Analog converter, said microprocessor further being responsive to an output from said microprocessor to switch the reference voltage output from one voltage to another.

* * * * *